US012750244B2

(12) United States Patent
Song et al.

(10) Patent No.: US 12,750,244 B2
(45) Date of Patent: Sep. 29, 2026

(54) APPARATUS AND METHOD FOR PERFORMING AUTHENTICATION FOR VEHICLE ON-DEMAND SERVICE

(71) Applicant: 42DOT INC., Seoul (KR)

(72) Inventors: Chang Hyeon Song, Seoul (KR); Sung Jun Kim, Seongnam (KR); Sung Yong Lee, Suwon (KR); Dae Joon Kim, Gwacheon (KR)

(73) Assignee: 42DOT INC., Seoul (KR)

( * ) Notice: Subject to any disclaimer, the term of this patent is extended or adjusted under 35 U.S.C. 154(b) by 179 days.

(21) Appl. No.: 18/427,973

(22) Filed: Jan. 31, 2024

(65) Prior Publication Data

US 2024/0267234 A1 Aug. 8, 2024

(30) Foreign Application Priority Data

Feb. 3, 2023 (KR) ........................ 10-2023-0014842
Mar. 30, 2023 (KR) ........................ 10-2023-0042322

(51) Int. Cl.
*H04L 9/32* (2006.01)
*H04L 9/08* (2006.01)

(52) U.S. Cl.
CPC .......... *H04L 9/3268* (2013.01); *H04L 9/0825* (2013.01); *H04L 9/3213* (2013.01)

(58) Field of Classification Search
CPC .... H04L 9/3268; H04L 9/0825; H04L 9/3213
See application file for complete search history.

(56) References Cited

U.S. PATENT DOCUMENTS

2004/0003237 A1* 1/2004 Puhl .................... B60R 16/0234 713/168
2014/0282470 A1* 9/2014 Buga ......................... G06F 8/65 717/170
2017/0111178 A1* 4/2017 Winkelvos ........ H04W 12/0431
2017/0305368 A1* 10/2017 Markham ........... B60R 16/0231
2019/0166460 A1* 5/2019 Thakur ..................... H04Q 9/00
2019/0238343 A1* 8/2019 Racklyeft ............. H04L 9/3268
2020/0045552 A1* 2/2020 Kim .................... H04W 12/069
2020/0177398 A1* 6/2020 Takemori ............ H04L 63/0823
2021/0288822 A1* 9/2021 Sorensen ................ B60R 25/24
2022/0159461 A1* 5/2022 Maass ................... H04L 9/0894
2023/0188361 A1* 6/2023 Misuraca .............. H04L 9/3297
2023/0327886 A1* 10/2023 Shin ...................... H04L 9/0643 713/171

* cited by examiner

*Primary Examiner* — Techane Gergiso
(74) *Attorney, Agent, or Firm* — Harvest IP Law, LLP

(57) ABSTRACT

Provided are a method and apparatus for performing authentication on a vehicle on-demand service. A method by which an integrated communication control unit performs authentication on a vehicle on-demand service, includes: storing, in a service authentication server, a first option value related to a vehicle service, received from a tool in factory (TIF) device; obtaining or generating a private root private key and a private root certificate; generating a device certificate and a device private key signed with the private root private key for each performance controller; generating a service token for the first option value by using the private root certificate and the private root private key; and transmitting the generated service token, the private root certificate, and the device private key for each performance controller.

8 Claims, 11 Drawing Sheets

APPARATUS AND METHOD FOR PERFORMING AUTHENTICATION FOR VEHICLE ON-DEMAND SERVICE

CROSS-REFERENCE TO RELATED APPLICATION

This application is based on and claims priority under 35 U.S.C. § 119 to Korean Patent Application Nos. 10-2023-0014842, filed on Feb. 3, 2023, 10-2023-0042322, filed on Mar. 30, 2023 in the Korean Intellectual Property Office, the disclosure of which is incorporated by reference herein in its entirety.

BACKGROUND

1. Field

The disclosure relates to an apparatus and method for performing authentication for a vehicle on-demand service.

2. Description of the Related Art

Recently, subscription service markets, which allow consumers to purchase and use desired functions for required periods, are gradually expanding. In this regard, vehicle subscription services are becoming more and more diverse, ranging from simple vehicle rental to electric vehicle charging services, autonomous driving, and vehicle management. In addition, vehicle subscription services are gradually expanding to include connectivity services, such as music and video streaming, route guidance, vehicle management, and safety and security, in relation to various internal functions.

In particular, recently, vehicle on-demand services that provide specific options, such as autonomous driving systems, in the form of subscription services have been introduced in earnest. When vehicle on-demand services are introduced, inconvenience and financial burden of having to select an unnecessary option to purchase a needed option according to a purchase package when purchasing a vehicle may be avoided and a desired function may be selected according to a taste through a subscription service, and in addition, a function may be temporarily canceled or re-subscribed, and thus, various needs of a consumer may be satisfied.

SUMMARY

Provided are an apparatus and method for performing authentication for a vehicle on-demand service. Aspects of the disclosure are not limited to those mentioned above, and other aspects and advantages of the disclosure, which are not mentioned, will be understood from descriptions below and will become more apparent by embodiments of the disclosure. In addition, the aspects and advantages of the disclosure will be realized through means and combinations thereof in the claims.

According to an embodiment of the disclosure, a method by which an integrated communication control unit performs authentication on a vehicle on-demand service, includes: storing, in a service authentication server, a first option value related to a vehicle service, received from a tool in factory (TIF) device; obtaining or generating a private root private key and a private root certificate; generating a device certificate and a device private key signed with the private root private key for each performance controller; generating a service token for the first option value by using the private root certificate and the private root private key; and transmitting the generated service token, the private root certificate, and the device private key for each performance controller.

According to another embodiment of the disclosure, a method by which an integrated communication control unit performs authentication on a vehicle on-demand service, includes: connecting to a database management (DM) server via encrypted secure communication (mutual transport layer security (mTLS)); obtaining a second option value related to a vehicle service received from the DM server by using the encrypted secure communication; verifying a signature by using one or more of the second option value, the signature, and a server certificate; decoding the second option value by using one or more of the second option value and a client private key; generating a service token, based on the signature and the second option value; and transmitting the generated service token for each performance controller.

According to another embodiment of the disclosure, an integrated communication control unit for performing authentication on a vehicle on-demand service: obtains a first option value related to a vehicle service received from a tool in factory (TIF) device; obtains or generates a private root private key and a private root certificate; generates a device certificate and a device private key signed with the private root private key for each performance controller; generates a service token for the first option value by using the private root certificate and the private root private key; and transmits the generated service token, the private root certificate, and the device private key for each performance controller.

In addition, provided are another method for implementing the disclosure, another system for implementing the disclosure, and a computer-readable recording medium having stored therein a computer program for executing the method.

Other aspects, features, and advantages may become clear from the following drawings, the claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
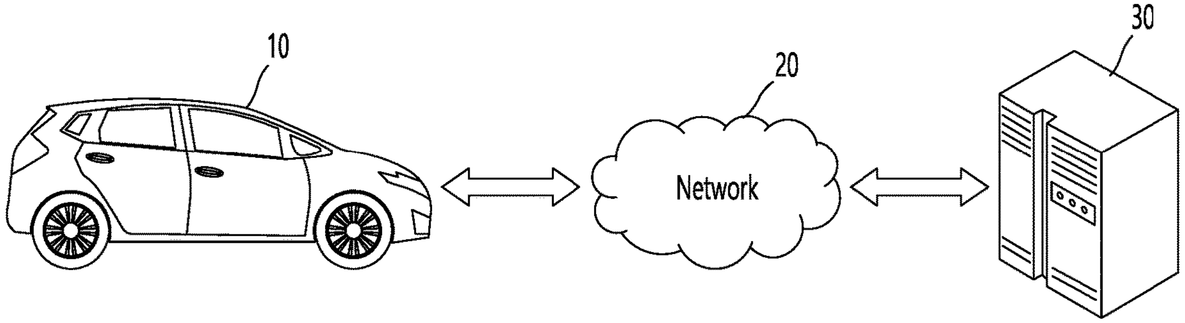
FIGS. 1 to 3 are diagrams for describing an apparatus or system for performing authentication for a vehicle on-demand service, according to an embodiment.

Advantages and features of the disclosure and methods of accomplishing the same may be understood more readily by reference to the following detailed description of the embodiments and the accompanying drawings. However, it should be understood that the disclosure is not limited to the embodiments presented below, but may be implemented in various different forms, and include all transformations, equivalents, and substitutes included in the spirit and scope of the disclosure. The embodiments presented below are provided to complete the disclosure and to fully inform one of ordinary skill in the art of the scope of the disclosure. In the description of the disclosure, certain detailed explanations of related art are omitted when it is deemed that they may unnecessarily obscure the essence of the disclosure.

Also, the terms used in the present specification are only used to describe specific embodiments, and are not intended to limit the disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, a "vehicle" may denote any type of transportation means including an engine and used to move a person or an object, such as a car, a bus, a motorcycle, a scooter, or a truck.

Hereinafter, the disclosure will be described in detail with reference to accompanying drawings.

Figure 2:
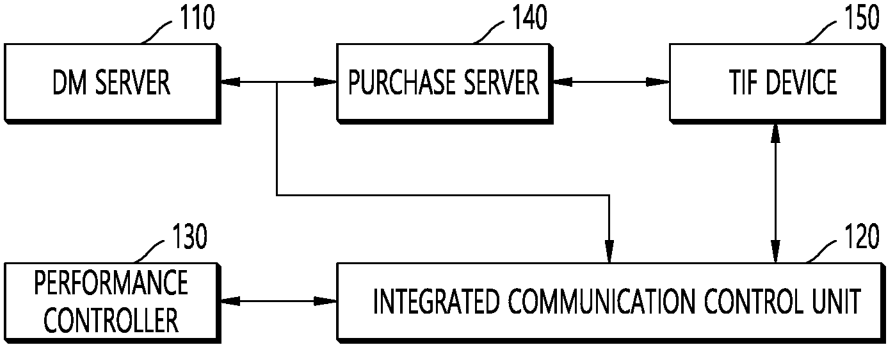
Figure 3:
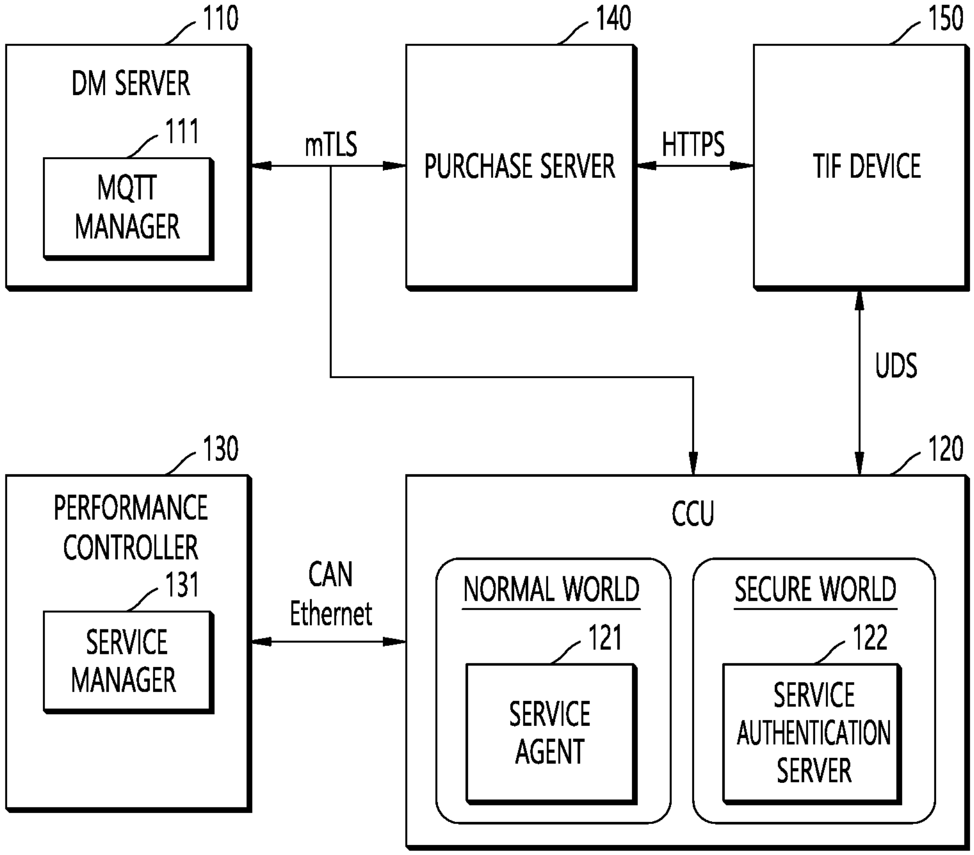

FIGS. 1 to 3 are diagrams for describing an apparatus or system for performing authentication for a vehicle on-demand service, according to an embodiment. Hereinafter, the disclosure will be described with reference to FIGS. 1 to 3.

Referring to FIG. 1, a vehicle 10, a network 20, and an external device 30 exist in an environment for performing authentication on the vehicle on-demand service. The vehicle 10 according to an embodiment may be an autonomous vehicle equipped with an autonomous driving device. In addition, the vehicle 10 may include therein an integrated communication control unit for providing the vehicle on-demand service, a performance controller for operating a service, and a controller area network (CAN) or Ethernet network device that is in charge of communication between devices within the vehicle 10. This will be further described with reference to FIGS. 2 and 3.

The network 20 is a network that connects the inside of the vehicle 10 and the external device 30, and a communication method is not limited. The communication method may include not only a communication method of using a communication network (for example, a mobile communication network, wired Internet, wireless Internet, or a broadcast network) that may be included in the network 20, but also one or more of a security network such as transport layer security (TLS) and a diagnostic network such as unified diagnostic service (UDS), but is not limited thereto.

The external device 30 may be an external device that is connected to the vehicle 10 to provide an on-demand service, such as a server or a diagnostic device. In particular, the external device 30 may be implemented as a computer device or a plurality of computer devices, which communicate with the vehicle 10 and the network 20 to provide a command, code, a file, content, and a service.

Referring to FIG. 2, a system 100 for performing authentication on a vehicle on-demand service is shown. In the specification below, for convenience of description, the system 100 for performing authentication on the vehicle on-demand service may be referred to as a service authentication system 100. FIG. 3 illustrates the service authentication system 100 in more detail.

According to an embodiment, the vehicle on-demand service is a function that allows a consumer to selectively purchase a software function according to his/her needs, and is a function that is installed in a vehicle and allows the consumer to customize a desired vehicle function whenever he/she wants. A vehicle equipped with the vehicle on-demand service is also referred to as a software defined vehicle (SDV). According to an embodiment, a consumer who has purchased an SDV may activate a desired function by additionally purchasing the function for a set period of time (permanently or for a specific period) by using the vehicle on-demand service.

Also, the vehicle on-demand service according to an embodiment is executed based on a public key infrastructure (PKI) in a secure world of the integrated communication control unit, and thus, the vehicle on-demand service may be safely provided against hacking, and the service authentication system 100 of the disclosure may implement the same.

In addition, according to the service authentication system 100 according to an embodiment, security within the integrated communication control unit may be applied to an on-demand product purchased by a user for the purpose of lump-sum payment permanent use and subscription for a specific period of time. Accordingly, even when the service authentication system 100 is hacked, infringement may not spread to another SDV, but may occur only in a relevant SDV.

Continuously referring to FIGS. 2 and 3, the service authentication system 100 may include a database management (DM) server 110, an integrated communication control unit 120, a performance controller 130, a tool in factory (TIF) device 150, and a purchase server 140.

First, the DM server 110 may be a server connected to the purchase server 140 and a service agent 121 in the integrated communication control unit 120, which will be described below, via mutual transport layer security (mTLS), and managing device information for operating the vehicle on-demand service, as a database.

In detail, the DM server 110 includes a message queuing telemetry transport (MQTT) manager 111. The MQTT manager 111 is connected to the purchase server 140 and the service agent 121 of the integrated communication control unit 120 via mTLS, and may transmit setting information (or a service option value) for each on-demand device to the service agent 121 of the integrated communication control unit 120.

Although not illustrated in the drawings, the DM server 110 may include, as stored values, root certificates, server certificates, and server private keys. In more detail, the root certificate is a public certificate issued by a root certificate authority (CA), which is the highest CA in a public key-based structure, and may be injected from the TIF device 150. The server certificate is an intermediate certificate signed with a root private key generated by the root CA. The server private key is a private key generated by the DM server 110 and may be used to generate the server certificate described above.

The MQTT manager 111 of the DM server 110 may use mTLS as an encryption protocol when communicating with the integrated communication control unit 120 and the purchase server 140. According to an embodiment, mTLS verifies whether the MQTT manager 111 and service agent 121 have correct private keys to confirm that they are legitimate communicating parties. In detail, mTLS may establish communication only when the service agent 121 of the integrated communication control unit 120 and the MQTT manager 111 of the DM server 110 exchange certificates to prove the identities and then the communicating parties are confirmed and trusted.

Next, the integrated communication control unit 120 is a control device for linking functions and transferring data inside and outside a vehicle. In detail, the integrated communication control unit 120 may include the service agent 121 and a service authentication server 122 as shown in FIG. 3. The service agent 121 operates in a normal world of the integrated communication control unit 120 and transmits a service token, a device certificate, and a device private key received from the service authentication server 122 to each performance controller 130.

Then, the service authentication server 122 operates in a secure world of the integrated communication control unit 120, generates a service token, a device certificate, and a device private key, and transmits the same to the service agent 121.

The integrated communication control unit 120 may obtain or generate one or more of a root certificate, a client private key, a client certificate, a private root private key, a private root certificate, a device certificate, and a device private key.

In detail, the root certificate is a public certificate issued by a root CA, which is the highest CA in a public key-based structure, as described above, and may be obtained from the DM server 110 or the TIF device 150.

The client private key is a key generated by the DM server 110, is used to generate a client certificate and may be obtained from the TIF device 150. The client certificate is an intermediate certificate generated by the DM server 110, is signed with a root private key, and may be obtained from the TIF device 150.

The private root private key is a key issued by the service authentication server 122 and may be used to generate a private root certificate. The private root certificate is a private root CA certificate issued by the service authentication server 122.

The performance controller 130 is an in-vehicle device that operates the vehicle on-demand service purchased by the user. In the following specification, the performance controller 130 may be used to integrally refer to first to Nth performance controllers, which are performance controllers in a vehicle.

The performance controller 130 may include a service manager 131 and may include a service token, a device certificate, and a device private key in secure storage.

The service manager 131 receives a service token, a certificate of the integrated communication control unit 120, and a device private key from the service agent 121 of the integrated communication control unit 120. The service token is a token issued by the service authentication server 122 of the integrated communication control unit 120, and service setting data may be encoded and stored in payload, and may be signed with a private root private key. The private root certificate is a certificate of the integrated communication control unit 120, issued by the service authentication server 122, and may be used to verify a digital signature of the service token. The device private key is a secret key issued for each performance controller 130 by the service authentication server 122 of the integrated communication control unit 120, and may be used to decode the service setting data in the service token.

The TIF device 150 is connected to a vehicle manufactured during a process only once and injects the root certificate, the client certificate, and the client private key issued by the DM server 110 to the secure storage of the secure world of the integrated communication control unit 120.

According to an embodiment, security assets refer to data, functions, and resources subject to analysis, which are to be protected, and a plurality of security assets may be identified by system models and use cases. Security objectives are divided into integrity, confidentiality, authenticity, availability, and freshness, and security objectives that may exist in each asset may be identified.

According to an embodiment, configuration data of the integrated communication control unit 120, which is a security asset, is vehicle on-demand service option information stored in the integrated communication control unit 120, and may have integrity security objective. Firmware of the integrated communication control unit 120, which is a security asset, is compiled firmware code that operates in the integrated communication control unit 120, and may have confidentiality and integrity security objectives. Communication with backend, which is a security asset, is data transmitted and received for service purchase and communication with the DM server 110, and may have confidentiality, authenticity, freshness, and availability security objectives. Cryptographic materials, which are security assets, are information about a key or certificate used to issue and encode/decode a service token in the integrated communication control unit 120, and may have confidentiality and integrity security objectives.

An on-demand service authentication service according to an embodiment of the disclosure may have one or more security requirements, and each security requirement may correspond to one or more security threats. Security threats corresponding to first to fifth security requirements according to an embodiment are shown in [Table 1] below.

TABLE 1

| Security Requirement | Security Requirement ID | Security Threat |
|---|---|---|
| First Security Requirement | SRV01 | Firmware Code Theft and Forgery or Alteration |
| Second Security Requirement | SRV02 | Data Forgery or Alteration |
| Third Security Requirement | SRV03 | Communication Intercept |
| Fourth Security Requirement | SRV04 | Communication Message Forgery or Alteration |
| Fifth Security Requirement | SRV05 | Unauthenticated Access |

In detail, the first security requirement (SRV01) is that an unpurchased service option value should not be activated through firmware theft, forgery, or alteration of the integrated communication control unit 120, memory dump, or the like. The second security requirement (SRV02) is that integrity should be secured such that service option information stored in the integrated communication control unit 120 is not altered. The third security requirement (SRV03) is that communication between DM servers 110 should be safe from a man-in-the-middle attack or a session hijacking attack. The fourth security requirement (SRV04) is that a service option value transmitted from the DM server 110 should not be forged or altered. The fifth security requirement (SRV05) is that an unauthorized entity (OTA diagnostic device), diagnostic device) should not be allowed to access the performance controller 130. Meanwhile, in the following specification, for convenience of description, the first to fifth security requirements may be referred to as the respective IDs of the security requirements.

According to an embodiment, there may be three use cases of a service authentication system. A first use case UC01 is a case where a vehicle on-demand service is purchased as a pre-purchase option before a vehicle is delivered, and service setting information of the vehicle may be set through a diagnostic device at a factory TIF line. A second use case UC02 is a case where a customer purchases a vehicle on-demand service after a vehicle is delivered, and when the customer purchases a service after the vehicle is delivered, the service setting information of the vehicle may be set through the DM server 110. A third use case UC03 is a case where an on-demand service is activated or deactivated when a vehicle is started after the vehicle is delivered, and each performance controller 130 may be activated or deactivated according to latest service setting information.

Continuously, an operating order of the first use case UC01 will be described in more detail. First, the TIF device 150 injects, to the secure world, the root certificate, the client certificate, and the client private key for mTLS connection to the DM server 110 through the service agent 121 of the integrated communication control unit 120.

Figure 4:
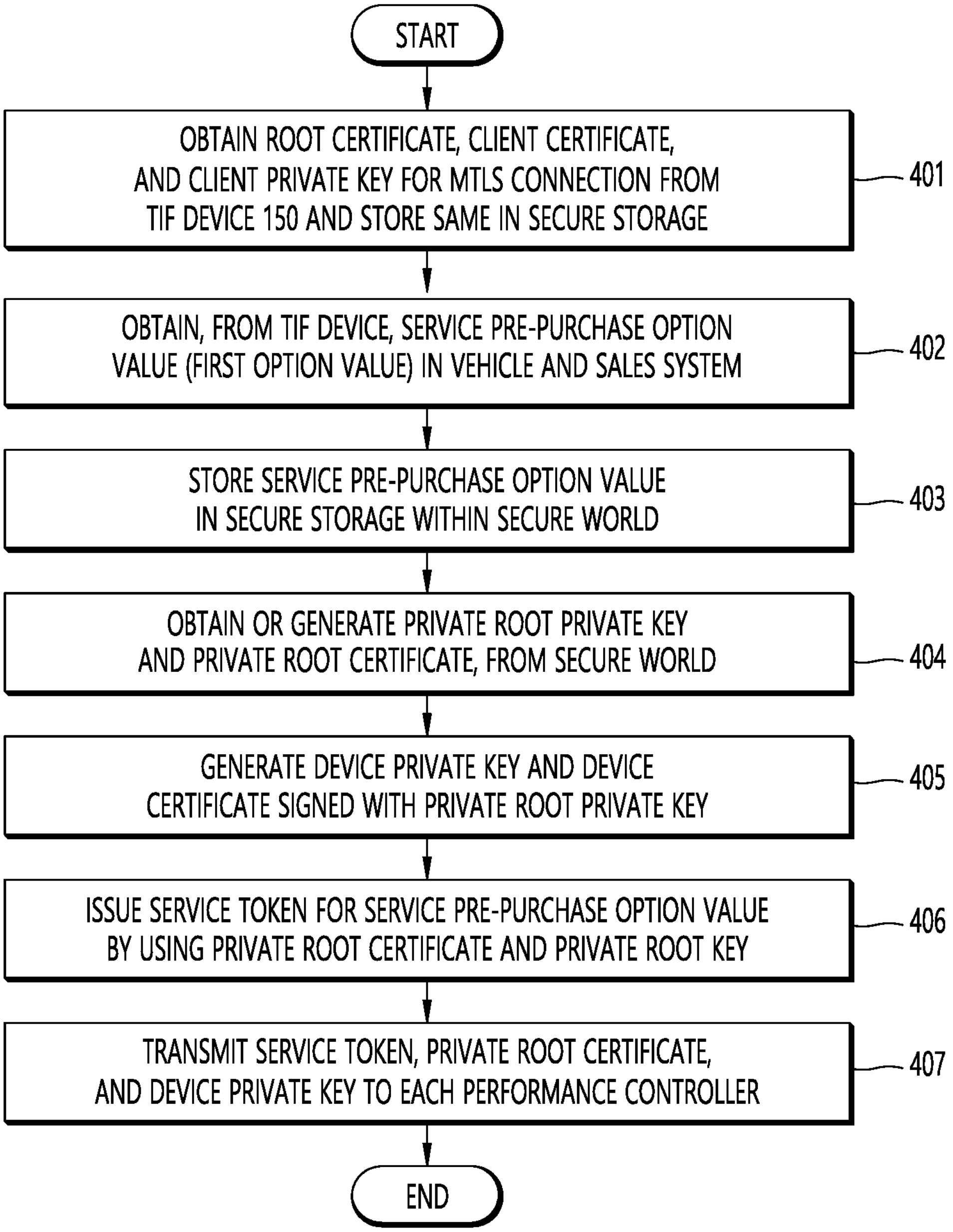
FIG. 4 is a flowchart of operations of a first use case, according to an embodiment.

FIG. 4 is a flowchart of operations of the first use case UC01, according to an embodiment.

FIG. 4 is a flowchart described assuming that the integrated communication control unit 120 is a subject of operation, but according to a modified embodiment of the disclosure, the subject of each operation may be the TIF device 150, the service agent 121 and the service authentication server 122 of the integrated communication control unit 120, and the service manager 131 of the performance controller 130.

In detail, the root certificate, the client certificate, and the client private key for mTLS connection to the DM server 110 are obtained from the TIF device 150 and stored in the secure storage (operation 401). Here, a security requirement ID of operation 401 is SRV05.

Then, the service agent 121 of the integrated communication control unit 120 obtains a service pre-purchase option value (service option value) in a vehicle and sales system, from the TIF device 150 (operation 402). Here, security requirements IDs of operation 402 are SRV02, SRV03, and SRV05. The service pre-purchase option value may be referred to as the first option value.

Meanwhile, together with operation 402, the DM server 110 may also obtain the service pre-purchase option value in the vehicle and sales system from the TIF device 150 and store the same in a database. Here, a security requirement ID is SRV03.

Next, the service agent 121 of the integrated communication control unit 120 stores the service pre-purchase option value of the vehicle, received from the TIF device 150, in the secure storage within the secure world (operation 403). To elaborate, the service authentication server 122 may obtain and store the service pre-purchase option value, i.e., the first option value, related to a vehicle service. Here, security requirement IDs are SRV01, SRV04, and SRV05.

Next, the service authentication server 122 may obtain or generate the private root private key (root.key) and the private root certificate of the integrated communication control unit 120, from the secure world (operation 404). The private root private key may be a private key for issuing a service token.

Then, the service authentication server 122 generates the device private key (device.key) and the device certificate signed with the private root private key for each performance controller 130 in the secure world (operation 405).

Next, the service authentication server 122 issues a service token for the service pre-purchase option value by using the private root certificate and private root private key (operation 406). In addition, the service authentication server 122 transmits the service token, the private root certificate, and the device private key generated for each performance controller 130 in the secure world to the service agent 121.

Then, the service agent 121 transmits the service token, the private root certificate, and the device private key received from the secure world to each performance controller 130 (operation 407). At this time, each performance controller 130 may store the service token, the device certificate, and the device private key received from the service agent 121 in the secure storage within each performance controller 130.

Meanwhile, security requirement IDs of operations 404 to 408 described above are SRV01, SRV02, and SRV05.

Figure 5:
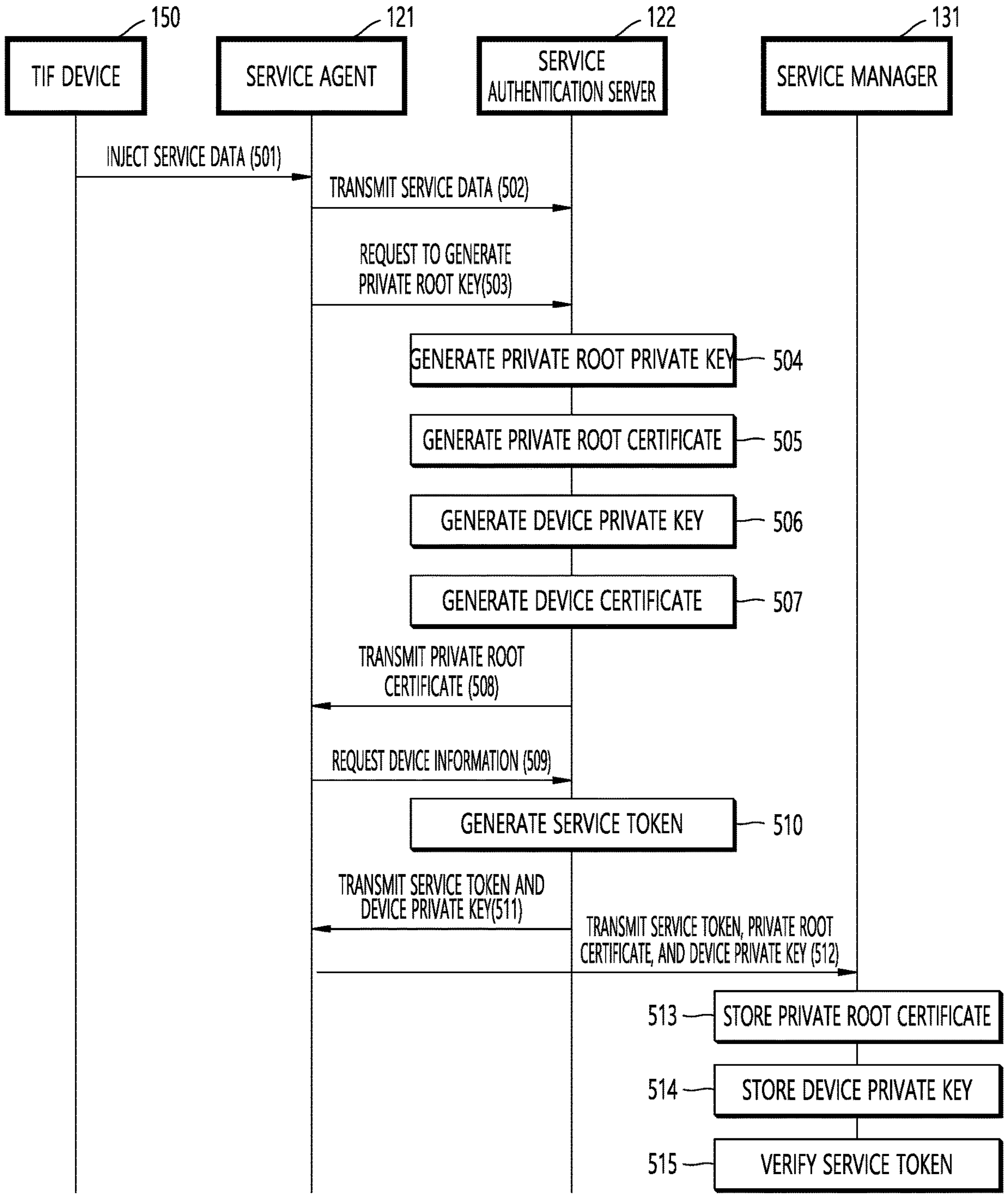
FIGS. 5 and 6 respectively show a first example and a second example of the first use case, according to an embodiment.
Figure 6:
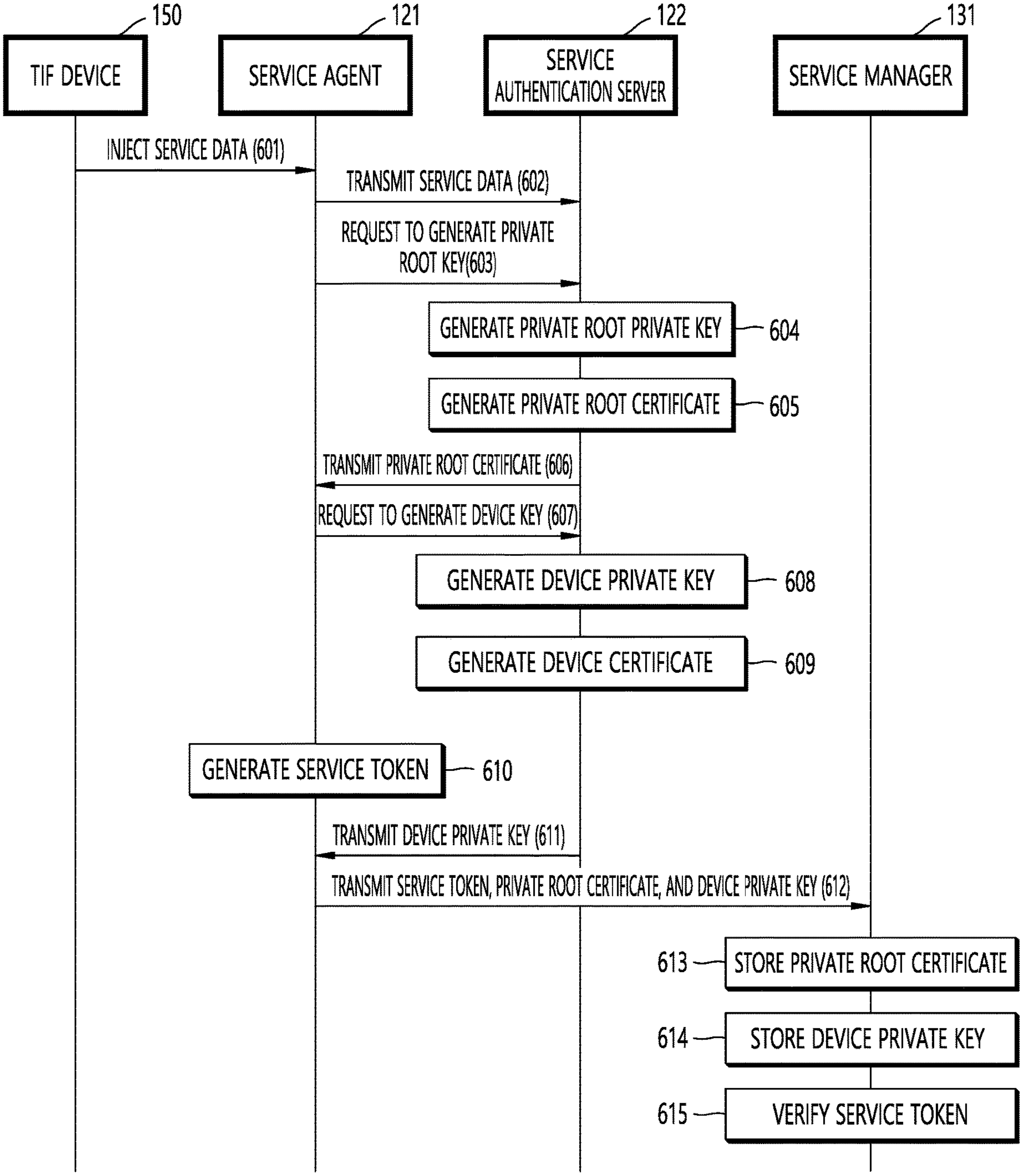

FIGS. 5 and 6 respectively show a first example UC01-1 and a second example UC01-2 of the first use case UC01, according to an embodiment.

In detail, FIGS. 5 and 6 respectively show the first example UC01-1 and the second example UC01-2, in which subjects of operations performing each operation of the first use case UC01 are different. In embodiments of FIGS. 5 and 6 below, operations of the first use case UC01 are performed by using the TIF device 150, the service agent 121 and the service authentication server 122 of the integrated communication control unit 120, and the service manager 131 of the performance controller 130.

First, FIG. 5 is a flowchart of operations of the first example UC01-1 in which the service authentication server 122 plays a main role more than the service agent 121 of the integrated communication control unit 120, in the first use case UC01 where a vehicle on-demand service has been purchased as a pre-purchase option before a vehicle is delivered.

Referring to FIG. 5, first, the TIF device 150 injects the first option value (the service pre-purchase option value as service data) into the service agent 121 of the integrated communication control unit 120 (operation 501).

Then, the service agent 121 stores the received first option value in the database and transmits the same to the service authentication server 122 in the secure world (operation 502).

Then, the service agent 121 requests the service authentication server 122 to generate a private root key (operation 503). According to an embodiment, the private root key may include the private root private key and the private root certificate (also referred to as a private root public key). The private root key be characterized in using an asymmetric key, being stored in the integrated communication control unit 120, and being generated in only one pair.

Next, the service authentication server 122 generates the private root private key (operation 504) and the private root certificate (operation 505).

Next, the service authentication server 122 generates device keys as much as the number of connected devices. According to an embodiment, the device key may include the device private key and the device certificate (also referred to as a device public key). The device key may be characterized in using an asymmetric key, being generated in multiple pairs, and being held only one pair for each performance controller. In other words, the service authentication server 122 generates the device private key for each performance controller 130 (operation 506) and generates the device certificate signed with the private root private key (operation 507).

Next, the service authentication server 122 transmits the private root certificate to the service agent 121 (operation 508).

Then, the service agent 121 requests the service authentication server 122 for device information (operation 509), and in response, the service authentication server 122 generates the service token (operation 510).

Then, the service authentication server 122 transmits the generated service token and device private key to the service agent 121 (operation 511).

Next, the service agent 121 transmits the service token, the private root certificate, and the device private key to the service manager 131 of each performance controller 130 (operation 512).

Next, the service manager 131 of each performance controller 130 stores the private root certificate and the device private key in the secure storage within each performance controller 130 (operations 513 and 514). The service manager 131 verifies the service token (operation 515).

FIG. 6 is a flowchart of operations of the second example UC01-2 in which the service agent 121 of the integrated communication control unit 120 plays a main role more than the service authentication server 122, in the first use case UC01 where a vehicle on-demand service has been purchased as a pre-purchase option before a vehicle is delivered. The second example UC01-2 of the first use case UC01 is a modified example of the first example UC01-1, and thus, description of overlapping or corresponding configurations will be omitted.

Referring to FIG. 6, first, the TIF device 150 injects the first option value (the service pre-purchase option value) into the service agent 121 of the integrated communication control unit 120 (operation 601).

Then, the service agent 121 stores the received first option value in the database and transmits the same to the service authentication server 122 in the secure world (operation 602).

Then, the service agent 121 requests the service authentication server 122 to generate a private root key (operation 603).

Next, the service authentication server 122 generates the private root private key (operation 604) and the private root certificate (operation 605).

Next, the service authentication server 122 transmits the generated private root certificate to the service agent 121 (operation 606).

Next, the service authentication server 122 receives, from the service agent 121, requests to generate a device key, as much as the number of performance controllers (operation 607). The service authentication server 122, which has received the device key generation request, generates the device private key for each performance controller 130 (operation 608) and generates the device certificate signed with the private root private key (operation 609).

Next, the service agent 121 generates the service token (operation 610).

Then, the service authentication server 122 transmits the generated device private key to the service agent 121 (operation 611).

Next, the service agent 121 transmits the service token, the private root certificate, and the device private key to the service manager 131 of each performance controller 130 (operation 612).

Next, the service manager 131 of each performance controller 130 stores the private root certificate and the device private key in the secure storage within each performance controller 130 (operations 613 and 614). The service manager 131 verifies the service token (operation 615).

Figure 7:
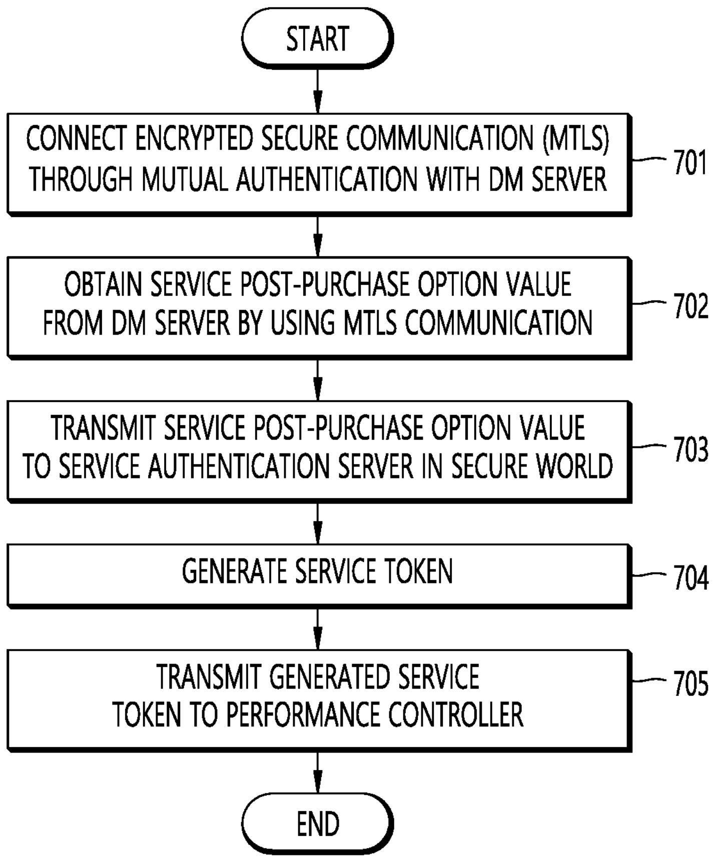
FIG. 7 is a flowchart of operations of a second use case, according to an embodiment.

FIG. 7 is a flowchart of operations of the second use case UC02, according to an embodiment.

In other words, FIG. 7 is a flowchart showing a case in which purchase information is updated after delivery, as the second use case UC02, according to an embodiment.

First, the DM server 110 stores a service post-purchase option value obtained from the purchase server 140, in the database. In the following specification, the service pre-purchase option value may be referred to as a second option value. Here, a security requirement ID is SRV02.

Referring to FIG. 7, the service agent 121 connects encrypted secure communication (mTLS) through mutual authentication between the DM server 110 and the service agent 121 in the integrated communication control unit 120 (operation 701).

Next, the service agent 121 obtains the service post-purchase option value from the DM server 110 by using mTLS communication (operation 702). Here, security requirement IDs of operations 701 and 702 are SRV03 and SRV04.

Then, the service agent 121 transmits the service post-purchase option value to the service authentication server 122 in the secure world (operation 703). Here, a security requirement applied between the service agent 121 and the service authentication server 122 may not exist.

Next, the service authentication server 122 generates the service token (operation 704). The service authentication server 122 transmits the generated service token to the service agent 121, and the service agent 121 transmits the received service token to each performance controller 130 (operation 705). Here, security requirement IDs are SRV02 and SRV05.

Next, the performance controller 130 stores the service token received from the integrated communication control unit 120 in the secure storage within each performance controller 130. Here, security requirement IDs are SRV01, SRV02, SRV03, SRV04, and SRV05.

Figure 8:
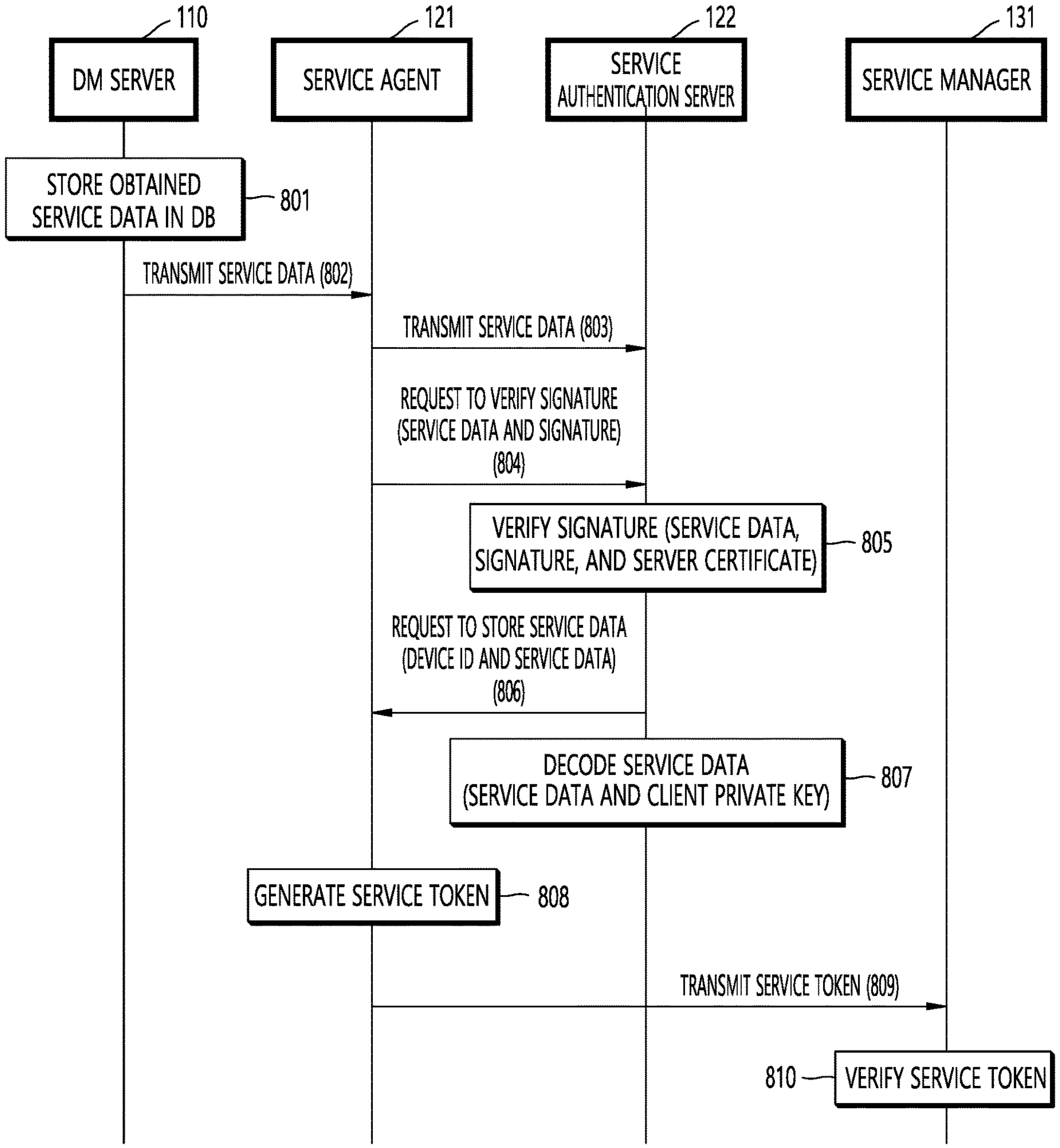
FIG. 8 is a flowchart of the operation of the second use case according to a subject of operation, according to an embodiment.

FIG. 8 is a flowchart of the operation of the second use case UC02 according to a subject of operation, according to an embodiment.

Referring to FIG. 8, unlike FIGS. 5 and 6, the second use case UC02 includes the DM server 110 instead of the TIF device 150 as a subject of operation. As described above, in the first use case UC01, a service option value of a vehicle is set in connection to a TIF line of a factory before the vehicle is delivered, but in the second use case UC02,a service option value of a vehicle is set through the DM server 110 when a user purchases an on-demand service product after the vehicle is delivered.

In detail, referring to FIG. 8, the DM server 110 first stores the service post-purchase option value (service data) obtained from the purchase server 140 in the database (operation 801), and then transmits the service data to the service agent 121 (operation 802).

Then, the service agent 121 transmits the obtained service data to the service authentication server 122 (operation 803).

Then, the service authentication server 122 receives a signature verification request including the service data and the signature (operation 804) and performs a signature verification procedure including the service data, the signature, and the server certificate (operation 805).

Next, the service authentication server 122 receives an on-demand service data storage request including a device ID and on-demand service data (operation 806), and performs an on-demand service data decoding procedure including the on-demand service data and the client private key. (operation 807).

Next, the service agent 121 generates the service token (operation 808).

Next, the service agent 121 transmits the generated service token to the service manager 131 of the performance controller 130 (operation 809), and the performance controller 130 that received the service token verifies the service token (operation 810).

Continuously, the third use case UC03 is a case where the on-demand service is activated or deactivated when the vehicle is started after the vehicle is delivered, as described above. In the third use case UC03, an on-demand service function of each performance controller 130 may be activated or deactivated according to latest on-demand service setting information.

In detail, in the third use case UC03, first, whether the service token has been forged or altered is identified by checking a digital signature of the service token with the private root certificate stored in the secure storage of each performance controller 130. Then, an AES key stored in a header of the service token is decoded with the device private key stored in the secure storage within each performance controller 130, and encoded payload data of the service token is decoded with the obtained AES key, thereby determining on/off of each performance controller 130. Here, security requirement IDs are SRV01, SRV02, SRV03, SRV04, and SRV05.

As described above, according to an embodiment, the service authentication system generates the service token for authentication, and the service data (service option value) is encoded and stored in the payload of the service token. The service token may be digitally signed with the private root key. Hereinafter, a structure of the service token, a method of generating the same, and a method of verifying (authenticating) the same will be described in detail.

The structure of the service token includes three fields of a header, a payload, and a trailer. First, the header of the service token may contain information about the AES key, a payload length, an AES key encryption algorithm (e.g., AES-256 CBC), a payload encryption algorithm (e.g., RSAES-OAEP 2048), and a signature generation algorithm. (e.g., RSASSA-PSS 2048). In this case, the AES key may be encoded with the device certificate and decoded with the device private key.

The payload of the service token may contain information about the service data, and in this case, the service data may be encoded and decoded with the AES key. The trailer of the service token may contain information about a signature for the header and the payload, and in this case the signature may be generated with the private root private key and authenticated with the private root certificate.

Figure 9:
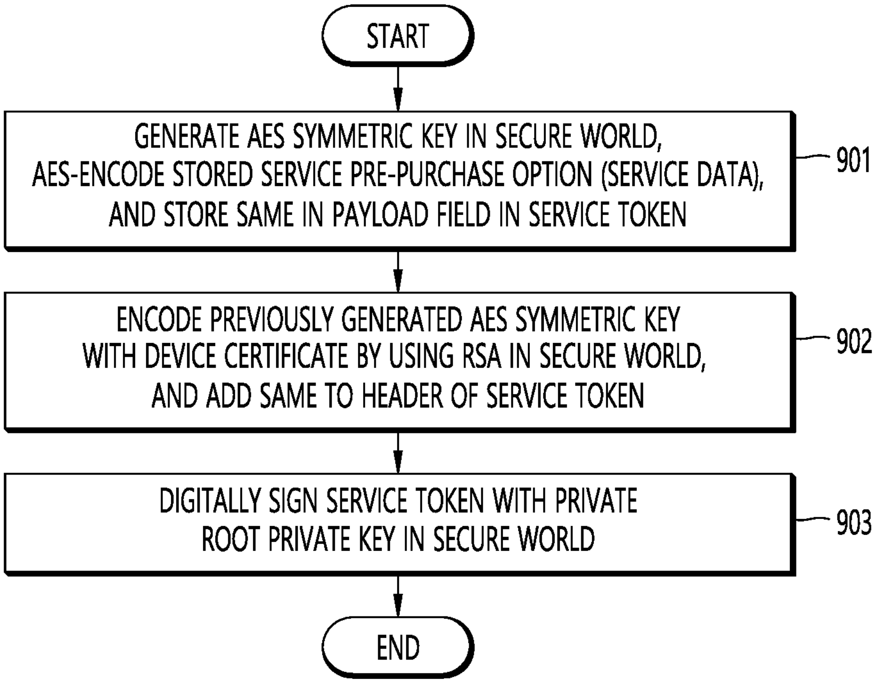
FIG. 9 is a flowchart of a method of generating a service token, according to an embodiment.

FIG. 9 is a flowchart of a method of generating the service token, according to an embodiment.

According to an embodiment, the generating of the service token may be performed by the integrated communication control unit 120. According to an embodiment, the service token may be generated by the service authentication server 122 in the first example UC01-1 of the first use case UC01, and the service token may be generated by the service agent 121 in the second example UC01-2 of the first use case UC01.

Hereinafter, an example in which the service token is generated by the service authentication server 122 according to the first example UC01-1 of the first use case UC01 will be mainly described.

First, the AES symmetric key is generated in the secure world, and the stored service pre-purchase option (service data) is AES-encoded and stored in the payload field in the service token (operation 901). According to an embodiment, the AES key is a symmetric key and may be randomly generated whenever the service token is generated.

Then, the previously generated AES symmetric key is encoded with the device certificate by using a public key algorithm (Rivest, Shamir, Adleman (RSA) according to an embodiment) in the secure world, and added to the header of the service token (operation 902).

Next, the service token is digitally signed with the private root private key in the secure world (operation 903).

Figure 10A:
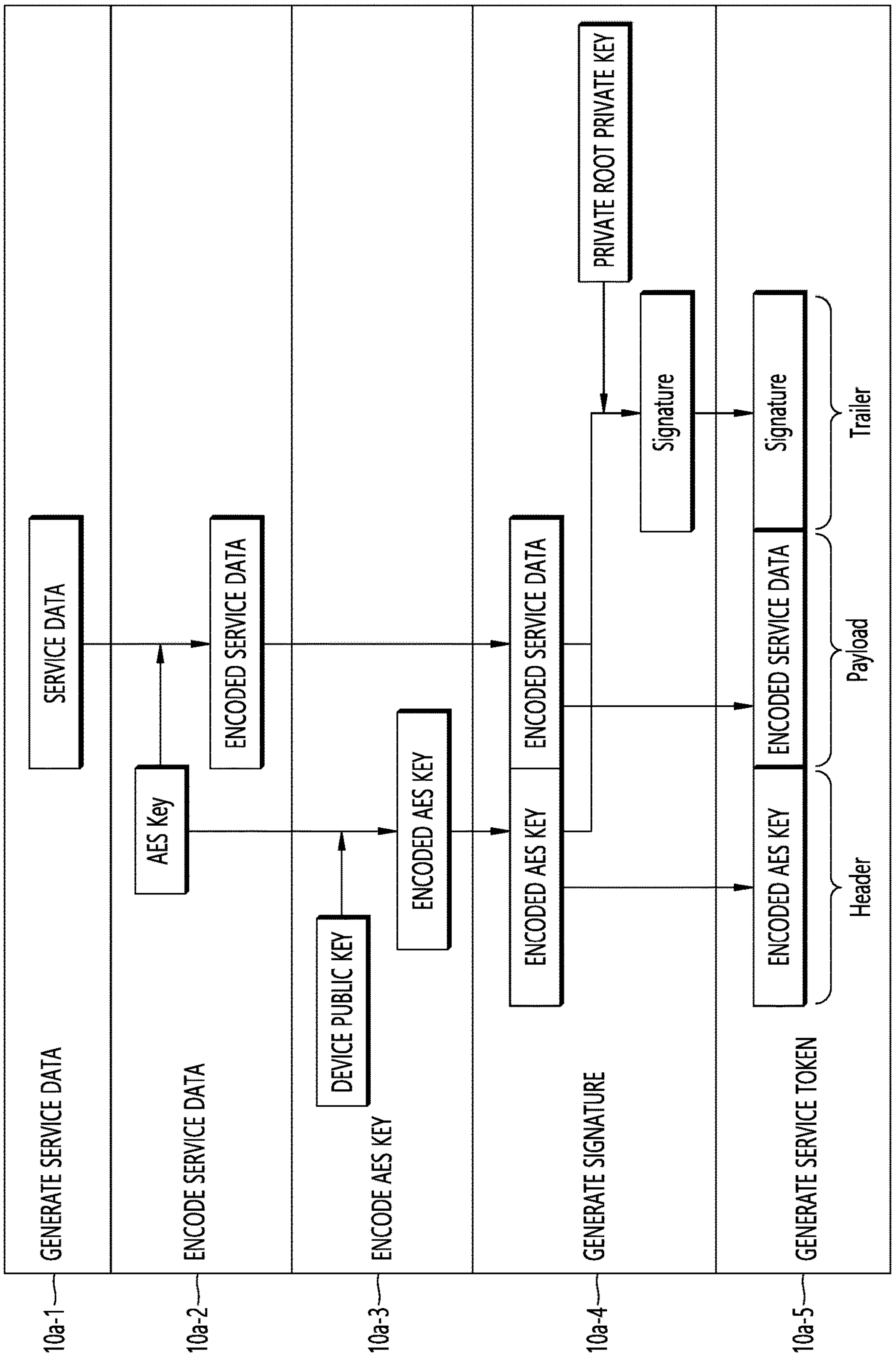
FIGS. 10A and 10B are diagrams for describing generation and verification of a service token, respectively.
Figure 10B:
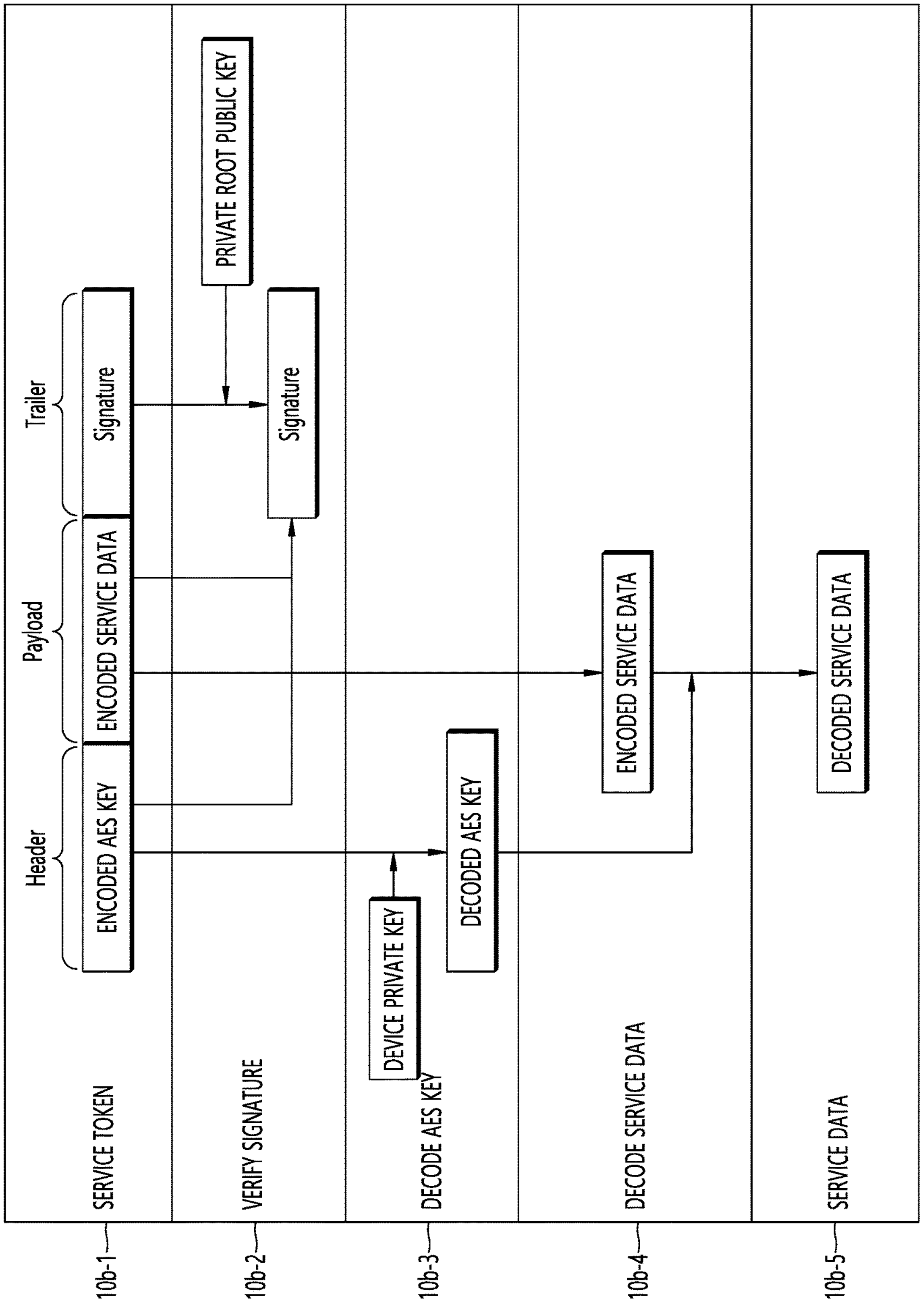

FIGS. 10A and 10B are diagrams for describing generation and verification of the service token, respectively.

FIG. 10A is a diagram for describing operations of generating the service token and which data has been used or generated in each operation.

First, the service data is generated (operation 10*a*-1).

Then, the service data is encoded (operation 10*a*-2). The encoded service data is generated by encoding the service data generated in operation 10*a*-1 by using a symmetric key algorithm (the AES key according to an embodiment).

Then, the AES key is encoded (operation 10*a*-3). The encoded AES key is generated by encoding the AES key with the device certificate (device public key).

Then, the signature is generated (operation 10*a*-4). The signature may be generated by using the private root private key on the encoded AES key generated in operation 10*a*-3 and the encoded service data generated in operation 10*a*-2.

Then, the service token is generated (operation 10*a*-5). The service token may include the fields of the header, the payload, and the trailer. The header field may contain information about the encoded AES key, the payload field may contain the encoded service data, and the trailer field may contain information about the signature.

FIG. 10B is a diagram for describing operations of verifying (authenticating) the service token and which data has been used or generated in each operation.

First, the service token is obtained (operation 10*b*-1). As described above with reference to FIG. 10A, the header field of the obtained service token may contain the information about the encoded AES key, the payload field may contain the encoded service data, and the trailer field may contain the information about the signature.

Then, the signature is verified (operation 10*b*-2). The signature may be verified by using the private root certificate (public key) on the encoded AES key and the encoded service data.

Then, the AES key is decoded (operation 10*b*-3). The decoded AES key may be generated by decoding the encoded AES key with the device private key.

Then, the service data is decoded (operation 10*b*-4). The encoded service data may be decoded with the decoded AES key.

Then, the decoded service data is obtained (operation 10*b*-5).

According to the disclosure, a vehicle on-demand service may be safely provided against hacking.

In addition, according to the disclosure, even when an authentication system of a vehicle on-demand service is hacked, infringement may not spread to other vehicles, but may occur only to a relevant vehicle.

The embodiments according to the disclosure may be implemented in a form of a computer program executable by various components on a computer, and such a computer program may be recorded in a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the disclosure or well known to one of ordinary skill in the computer software field. Examples of the computer program include not only machine codes generated by a compiler, but also high-level language codes executable by a computer by using an interpreter or the like.

According to an embodiment, a method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be at least temporarily stored or temporarily generated in the machine-readable storage medium such as a server of a manufacturer, a server of an application store, or a memory of a relay server.

Unless an order is clearly stated or unless otherwise stated, operations configuring a method according to the disclosure may be performed in an appropriate order. the disclosure is not necessarily limited by an order the operations are described. In the disclosure, the use of all examples or exemplary terms (for example, "etc.") is merely for describing the disclosure in detail and the scope of the disclosure is not limited by those examples or exemplary terms unless defined in the claims. Also, it would be obvious to one of ordinary skill in the art that various modifications, combinations, and changes may be configured according to design conditions and factors within the scope of claims or equivalents.

Therefore, the scope of the disclosure should not be determined limitedly based on the above-described embodiments, and not only the appended claims but also all ranges equivalent to or equivalently changed from the claims are within the scope of the disclosure.

What is claimed is:

1. A method by which an integrated communication control unit performs authentication on a vehicle on-demand service, the method comprising:

storing, in a service authentication server, a first option value related to a vehicle service, received from a tool in factory (TIF) device;

obtaining or generating a private root private key and a private root certificate;

generating, for each performance controller, a device certificate and a device private key signed with the private root private key;

generating a service token for the first option value; and transmitting, for each performance controller, the generated service token, the private root certificate, and the device private key, wherein the generating of the service token comprises:

encoding the first option value using an advanced encryption standard (AES) symmetric key and storing the same in a payload field in the service token;

encoding the AES symmetric key using the device certificate and adding the same to a header field in the service token; and digitally signing the service token with the private root private key.

2. The method of claim 1, wherein the private root private key and the private root certificate are generated within a secure world of the integrated communication control unit.

3. The method of claim 2, wherein the service token is generated within a normal world of the integrated communication control unit.

4. The method of claim 1, wherein the private root private key and the private root certificate are generated in the service authentication server of the integrated communication control unit.

5. The method of claim 4, wherein the service token is generated within a normal world of the integrated communication control unit.

6. A method by which an integrated communication control unit performs authentication on a vehicle on-demand service, the method comprising:

receiving a second option value related to a vehicle service from a DM server;

obtaining or generating a private root private key and a private root certificate;

generating, for each performance controller, a device certificate and a device private key signed with the private root private key;

generating a service token for the second option value; and transmitting, for each performance controller, the generated service token, the private root certificate, and the device private key, wherein the generating of the service token comprises:

encoding the second option value using an advanced encryption standard (AES) symmetric key and storing the same in a payload field in the service token;

encoding the AES symmetric key using the device certificate and adding the same to a header field in the service token; and digitally signing the service token with the private root private key.

7. An integrated communication control unit for performing authentication on a vehicle on-demand service, wherein the integrated communication control unit:

obtains a first option value related to a vehicle service received from a tool in factory (TIF) device;

obtains or generates a private root private key and a private root certificate;

generates, for each performance controller, a device certificate and a device private key signed with the private root private key;

generates a service token for the first option value; and transmits, for each performance controller, the generated service token, the private root certificate, and the device private key, wherein the integrated communication control unit generates the service token for the first option value, by encoding the first option value using an advanced encryption standard (AES) symmetric key and storing the same in a payload field in the service token, encoding the AES symmetric key using the device certificate and adding the same to a header field in the service token, and digitally signing the service token with the private root private key.

8. A non-transitory computer-readable recording medium having recorded thereon a program for executing the method of claim 1 on a computer.

* * * * *